(12) United States Patent
Speidel et al.

(10) Patent No.: US 10,923,743 B2
(45) Date of Patent: Feb. 16, 2021

(54) GAS SUPPLY, CONDITIONING, AND DISCHARGE SYSTEMS AND METHODS

(71) Applicant: REINZ-DICHTUNGS-GMBH, Neu-Ulm (DE)

(72) Inventors: Andre Speidel, Orsenhausen (DE); Rainer Glueck, Dornstadt (DE)

(73) Assignee: REINZ-DICHTUNGS-GMBH, Neu-Ulm (DE)

( * ) Notice: Subject to any disclaimer, the term of this patent is extended or adjusted under 35 U.S.C. 154(b) by 162 days.

(21) Appl. No.: 16/064,076

(22) PCT Filed: Dec. 16, 2016

(86) PCT No.: PCT/EP2016/081499
§ 371 (c)(1),
(2) Date: Jun. 20, 2018

(87) PCT Pub. No.: WO2017/108624
PCT Pub. Date: Jun. 29, 2017

(65) Prior Publication Data
US 2018/0358635 A1 Dec. 13, 2018

(30) Foreign Application Priority Data
Dec. 21, 2015 (DE) .................. 20 2015 106 976

(51) Int. Cl.
*H01M 8/04014* (2016.01)
*H01M 8/04828* (2016.01)
(Continued)

(52) U.S. Cl.
CPC ... *H01M 8/04014* (2013.01); *H01M 8/04029* (2013.01); *H01M 8/04074* (2013.01);
(Continued)

(58) Field of Classification Search
CPC ......... H01M 8/04014; H01M 8/04126; H01M 8/04753; H01M 8/04761; H01M 8/04768;
(Continued)

(56) References Cited

U.S. PATENT DOCUMENTS

2002/0006537 A1 1/2002 Kobayashi
2005/0019633 A1 1/2005 Tanaka
(Continued)

FOREIGN PATENT DOCUMENTS

CN 1591951 A 3/2005
CN 101432920 A 5/2009
(Continued)

OTHER PUBLICATIONS

European Patent Office, International Search Report with Written Opinion issued in PCT/EP2016/081499, dated Apr. 5, 2017, 16 pages, European Patent Office, Rijswijk, Netherlands.
(Continued)

*Primary Examiner* — Gary D Harris
(74) *Attorney, Agent, or Firm* — McCoy Russell LLP (57) ABSTRACT

A gas supply and discharge system may have a fuel cell arrangement having at least one electrode, a gas-gas heat exchanger for exchanging heat between a first gas to be supplied to the electrode and a second gas discharged or dischargeable from the second electrode, and a humidifier for transferring humidity between the first gas and the second gas. The first gas to be supplied to the electrode can be introduced into the gas-gas heat exchanger before the supply of the first gas to the electrode, and such that the second gas can be introduced into the gas-gas heat exchanger from the electrode in order to transfer heat between the first gas and the second gas in the gas-gas heat exchanger. The first gas and the second gas can be introduced into the humidifier from the gas-gas heat exchanger in
(Continued)

order to transfer humidity between the first gas and the second gas in the humidifier. The first gas can be introduced into the fuel cell arrangement from the humidifier and can be supplied to the electrode.

9 Claims, 7 Drawing Sheets

(51) Int. Cl.
*H01M 8/04029* (2016.01)
*H01M 8/04007* (2016.01)
*H01M 8/04111* (2016.01)
*H01M 8/04119* (2016.01)
*H01M 8/04746* (2016.01)
*F28D 21/00* (2006.01)

(52) U.S. Cl.
CPC .... *H01M 8/04111* (2013.01); *H01M 8/04126* (2013.01); *H01M 8/04149* (2013.01); *H01M 8/04753* (2013.01); *H01M 8/04761* (2013.01); *H01M 8/04768* (2013.01); *H01M 8/04776* (2013.01); *H01M 8/04828* (2013.01); *F28D 21/0015* (2013.01); *F28D 2021/0043* (2013.01)

(58) Field of Classification Search
CPC ......... H01M 8/04828; H01M 8/04029; H01M 8/04074; H01M 8/04111; H01M 8/04149; H01M 8/04776; F28D 2021/0043; F28D 21/0015
USPC ........................................................ 429/413
See application file for complete search history.

(56) References Cited

U.S. PATENT DOCUMENTS

| | | | |
|---|---|---|---|
| 2005/0048338 A1 | 3/2005 | Kobayashi et al. | |
| 2010/0009226 A1 | 1/2010 | Konrad et al. | |
| 2010/0055542 A1 | 3/2010 | Matsuoka | |
| 2015/0340715 A1* | 11/2015 | Chang ............... | H01M 8/04074 429/414 |

FOREIGN PATENT DOCUMENTS

| | | |
|---|---|---|
| CN | 102195049 A | 9/2011 |
| CN | 102318117 A | 1/2012 |
| CN | 103259029 A | 8/2013 |
| CN | 104993161 A | 10/2015 |
| DE | 102007003144 | 7/2008 |
| DE | 102008039911 | 3/2010 |
| DE | 102009051476 | 5/2011 |
| DE | 102010001221 | 7/2011 |
| DE | 102012018874 | 3/2014 |
| JP | 2012221657 A | 11/2012 |
| WO | 2010046028 A1 | 4/2010 |

OTHER PUBLICATIONS

China National Intellectual Property Administration, Office Action and Search Report Issued in Application No. 201680075209.1, dated Jul. 9, 2020, 14 pages.

* cited by examiner

GAS SUPPLY, CONDITIONING, AND DISCHARGE SYSTEMS AND METHODS

BACKGROUND OF THE INVENTION

The invention relates to a gas feed and discharge system as well as to a method for leading gas onto at least one electrode of a fuel cell arrangement and for leading gas away from the electrode.

SUMMARY OF THE INVENTION

Typically, for operation of a fuel cell, a gaseous fuel and an oxidant are fed to the electrodes of the fuel cell. E.g. molecular hydrogen or methanol can be used as fuel. Usually, oxygen-containing gases e.g. air serve as oxidants. The product of the reaction between the fuel and the oxidant must be discharged out of the fuel cell. Furthermore, known fuel cell systems typically comprise a cooling system for dissipating waste heat which arises with the reaction, and a humidifier for setting/adjusting a humidity degree of the gases which are fed to the system. The humidification of the gases serves e.g. for maintaining the function of an ion conductor which is arranged between the electrodes of the fuel cell.

A fuel cell system with an air delivery device for compressing feed air for a fuel cell and with a feed air cooler for cooling the feed air by the exhaust air which flows away from the fuel cell is known from the document DE102012018874 A1. Air is fed to a cathode compartment of the fuel cell via an air delivery (transport) device, the feed air cooler and via a humidifier. Exhaust air from the cathode compartment gets to the surroundings again via the humidifier, the feed air cooler and via a turbine. The costs for the manufacture and for the operation of such a system are often predominantly determined by the construction type and the operating manner of the humidifier.

Departing from the state of the art according to DE102012018874 A1, it is therefore the object of the present invention to provide a system which ensures an improved efficiency and/or a longer service life of the humidifier.

This object is achieved by a system and by a method according to the independent claims. Special embodiments are described in the dependent claims.

What is suggested therefore is a gas feed and discharge system comprising:
a fuel cell arrangement with at least one electrode;
a gas-gas heat exchanger for transferring heat between a first gas which is to be fed to the electrode and a second gas which is led away or can be led away from the electrode; and
a humidifier for transferring humidity between the first gas and the second gas.
The fuel cell arrangement, the gas-gas heat exchanger and the humidifier are designed and are in fluid connection with one another, in a manner such that
the first gas which is to be fed to the electrode can be led into the gas-gas heat exchanger before leading the first gas onto the electrode and that coming from the electrode, the second gas can be led into the gas-gas heat exchanger for transferring heat between the first gas and the second gas in the gas-gas heat exchanger,
that coming from the gas-gas heat exchanger and after the heat transfer between the first gas and the second gas in the gas-gas heat exchanger, the first gas and the second gas can be led into the humidifier for transferring humidity between the first gas and the second gas in the humidifier and that coming from the humidifier, the first gas can be introduced into the fuel cell arrangement and fed to the electrode.

What is also suggested is a method for leading a first gas onto at least one electrode of a fuel cell arrangement and for leading a second gas away from the at least one electrode, comprising the steps;
leading the first gas which is to be fed to the electrode into a gas-gas heat exchanger and leading the second gas which is led away from the electrode into the gas-gas heat exchanger, for transferring heat between the first gas and the second gas in the gas-gas heat exchanger;
coming from the gas-gas heat exchanger, leading the first and second gas which are temperature-adjusted in the gas-gas heat exchanger into a humidifier for transferring humidity between the first gas and the second gas in the humidifier; and
coming from the humidifier, leading the first gas which is humidified or dehumidified in the humidifier, onto the electrode.

The system which is suggested here and the method which is suggested here therefore differ from the state of the art according to DE102012018874 A1 in particular in that coming from the gas-gas heat exchanger and after the heat transfer between the first gas and the second gas in the gas-gas heat exchanger, the first gas and the second gas can be led or are led into the humidifier for the transfer of humidity between the first gas and the second gas in the humidifier.

It has been found that the efficiency as well as the service life of the humidifier is improved in this manner. For example, the surface area of a water exchange membrane which is arranged in the humidifier with the system which is suggested here can be designed in a smaller manner compared to known systems, for achieving a desired humidity transfer between the first and the second gas. This can significantly reduce the costs for manufacturing the humidifier. Likewise, the operating costs can be significantly lowered by way of the achieved extension of the service life of the humidifier. The humidity transfer in the humidifier is additionally improved by way of an undesired condensation of the humidity which is contained in the colder of the two gases, in the humidifier, being able to be reduced or prevented already before leading the first and the second gas into the humidifier due to the heat transfer between the first and the second gas in the gas-gas heat exchanger. The second gas which is led away from the electrode thus usually has a lower temperature and a higher degree of humidity than the first gas which is to be fed to the electrode. A heating of the more humid second gas is therefore then effected in the gas-gas heat exchanger. In this case, an undesirable condensation of the water vapour which is entrained in the second gas, in the humidifier, can be reduced or prevented by way of the heating of the more humid second gas by way of the warmer and drier first gas in the gas-gas heat exchanger.

Preferably, the gas-gas heat exchanger and the fuel cell arrangement are in fluid connection in a manner such that the second gas can be led or is led from the fuel cell arrangement into the gas-gas heat exchanger in a direct manner. A temperature adjustment of the second gas before leading the second gas into the gas-gas heat exchanger can therefore be prevented, so that a particularly large quantity of heat can be transferred or is transferred between the first and the second has in the gas-gas heat exchanger. For example, the temperature of the second gas on leading the second has out of the fuel cell arrangement is often lower than the temperature of the first gas on leading the first gas into the gas-gas heat exchanger. A particularly efficient cooling of the first gas is then effected by way of a direct connection between the fuel cell arrangement and the gas-gas heat exchanger for the leading the second gas from the fuel cell arrangement into the gas-gas heat exchanger in a direct manner.

With regard to known gas feed and discharge systems for fuel cell arrangements, a heat transfer between the first gas which is to be led to the electrode and the second gas which is led away from the electrode is usually effected via an additional circulating coolant, whose temperature is typically lower than the temperature of the first gas and the temperature of the second gas. In contrast, the heat exchange between the first and the second gas is preferably not effected via such an addition coolant in the gas-gas heat exchanger which is suggested here. Instead, the thermal contact between the first gas and the second gas in the gas-gas heat exchanger which is suggested here is preferably effected merely by way of solid bodies which are designed in a manner such that they are configured for leading the first gas and the second gas and for separating the first gas from the second gas. E.g. the gas-gas heat exchanger can comprise a first volume for leading the first gas and a second volume for leading the second gas, wherein the first and the second volume are in thermal contact for the transfer of the heat between the first gas which is led or can be led in the first volume and the second gas which is led or can be led in the second volume. The thermal contact between the first gas and the second gas can be realised for example via plates or lamellae. The gas-gas heat exchanger can therefore be designed as a plate heat exchanger or as a lamellae heat exchanger.

After the heat transfer between the first gas and the second gas in the gas-gas heat exchanger which is suggested here, the first gas and the second gas typically have a higher average temperature, which is contrast to gas feed and discharge systems, with regard to which heat is transferred between the first and/or the second gas and an additional circulating coolant. It has been found that this can significantly improve the efficiency of the humidity transfer between the first gas and the second gas in the humidifier.

The humidifier usually comprises a volume for leading the first gas and a volume for leading the second gas. The volume of the humidifier for leading the first gas is hereinafter called the third volume, so as to differentiate from the aforementioned first and second volume of the gas-gas heat exchanger. The volume of the humidifier for leading the second gas is hereinafter called a fourth volume. The humidifier usually comprises a water exchange element which separates the third and the fourth volume in a manner such that a humidify transfer between the first gas which is led or can be led in the third volume and the second gas which is led or can be led in the fourth volume is effected via the water exchange element of the humidifier. The water exchange element can e.g. comprise at least one water exchange membrane and/or capillaries for transferring humidify between the third volume and the fourth volume. The humidifier can just as well be designed as a tube humidifier. A humidity transfer of the more humid of the two gases onto the drier of the two cases is effected in the humidifier. If the second gas is the more humid of the two gases, then a humidity transfer is effected in the humidifier from the second gas which is led in the fourth volume onto the first gas which is led in the third volume.

The first and the second volume of the gas-gas heat exchanger as well as the third and the fourth volume of the humidifier usually each comprise an inlet for leading gas into the respective volume and an outlet for the leading gas out of the respective volume. The inlet of the second volume and the outlet of the third volume are usually each in fluid connection with the fuel cell arrangement, in particular with the electrode. E.g. the inlet of the second volume and the outlet of the third volume can each be in direct fluid connection with the fuel cell arrangement. It is likewise conceivable for further system components, through which the first and second gas flow to be arranged between the inlet of the second volume and/or the outlet of the third volume and the fuel cell arrangement.

The outlet of the first volume is usually in fluid connection with the inlet of the third volume. E.g. the outlet of the first volume can be in direct fluid connection with the inlet of the third volume. It is likewise conceivable for further system components, through which the first gas flows, to be arranged between the outlet of the first volume and the inlet of the third volume.

The outlet of the second volume is usually in fluid connection with the inlet of the fourth volume. E.g. the outlet of the second volume can be in direct fluid connection with the inlet of the fourth volume. It is likewise conceivable for further system components, through which the second gas flows, to be arranged between the outlet of the second volume and the inlet of the third volume.

As described above, the inlet of the second volume is connected to the fuel cell arrangement preferably in a direct manner via a conduit, for leading the second gas which is led away out of the fuel cell arrangement, into the second volume in a direct manner. This conduit then extends from the outlet of the fuel cell arrangement up to the inlet of the second volume.

The electrode can be a cathode of the fuel cell arrangement. The first gas is then a reaction gas which is to be fed to the cathode and the second gas is then a cathode exhaust gas. The fuel cell arrangement can be a hydrogen fuel cell arrangement. E.g. the first gas can comprise air, in particular oxygen and the second gas can comprise hydrogen A gas-liquid heat exchanger can additionally be arranged upstream and/or downstream of the gas-gas heat exchanger, for the improved setting of a desired temperature of the first gas and/or of the second gas before leading the first gas and the second gas into the humidifier. The first gas and/or the second gas can thus be led into a gas-liquid heat exchanger for transferring heat between the first gas and/or the second gas and a liquid coolant. An improved heat dissipation from the complete system arises on account of this, so that the exchange surface of the gas-gas heat exchanger can be reduced in size.

If the gas-liquid heat exchanger is arranged upstream of the gas-gas heat exchanger, then the first gas and/or the second gas is led into the gas-liquid heat exchanger before leading the first gas and/or of the second gas into the gas-gas heat exchanger. Coming from the gas-liquid heat exchanger, the first gas and/or the second gas are then led into the gas-gas heat exchanger. If in contrast the gas-liquid heat exchanger is arranged downstream of the gas-gas heat exchanger, then coming from the gas-gas heat exchanger, the first gas and/or the second gas are not led into the gas-liquid heat exchanger until after the heat transfer between the first and the second gas in the gas-gas heat exchanger. Coming from the gas-liquid heat exchanger, the first and/or the second gas are then led into the humidifier. Of course, two gas-liquid heat exchangers can also be provided, of which a first one is arranged upstream of the gas-gas heat exchanger and of which a second one is arranged downstream of the gas-gas heat exchanger.

The gas-liquid heat exchanger can be designed in a manner such that a liquid coolant can be circulated in it or through it, so that heat can be transferred between the coolant and the first and/or second gas. In particular, the gas-liquid heat exchanger can be designed for cooling the first and/or the second gas. The gas-liquid heat exchanger can comprise a volume for leading the first gas and/or a volume for leading the second gas. The volume of the gas-liquid heat exchanger for leading the first gas is hereinafter called the fifth volume. If a volume of the gas-liquid heat exchanger is also provided for leading the second gas, then this is hereafter called the sixth volume. The fifth volume is typically in fluid connection with the previously described first volume of the gas-gas heat exchanger. The sixth volume can be in fluid connection with the second volume of the gas-gas heat exchanger. If the gas-liquid heat exchanger is arranged upstream of the gas-gas heat exchanger, then the sixth volume can further be in fluid connection with the fuel cell arrangement. If in contrast the gas-liquid heat exchanger is arranged downstream of the gas-gas heat exchanger, then the fifth volume is typically additionally in fluid connection with the third volume of the humidifier. In this case, the sixth volume can additionally be in fluid connection with the fourth volume of the humidifier.

The system can comprise a compressor for compressing the first gas. The first gas can therefore be compressed before leading the first gas onto the electrode. A reaction rate of the reaction between the first gas and the electrode can therefore be increased and the efficiency of the fuel cell arrangement improved. The compressor can be designed e.g. as a piston compressor or as a rotation compressor.

The compressor can be in fluid connection with the gas-gas heat exchanger in a manner such that the first gas can be led into the gas-gas heat exchanger, in particular into the first volume of the gas-gas heat exchanger after the compressing of the first gas in the compressor. The first gas can therefore be compressed before leading the first gas into the gas-gas heat exchanger.

The compressor can also be in fluid connection with the humidifier and the fuel cell arrangement in a manner such that coming from the humidifier, the first gas can be led into the compressor after the humidity transfer between the first and the second gas in the humidifier and coming from the compressor can be led into the fuel cell arrangement and fed to the electrode after the compressing of the first gas in the compressor. One can therefore envisage the first gas being compressed after the humidity transfer between the first gas and the second gas is effected in the humidifier. In this case, the compressor is therefore typically in fluid connection with the volume of the humidifier for leading the first gas, thus with the previously described third volume, and with the fuel cell arrangement. A heating of the first gas is usually effected in the compressor. If the compressor is arranged upstream of the humidifier, then this under certain circumstances can lead to a damage of the water exchange element of the humidifier on account of the temperature increase. This can be avoided by way of the last described compressing of the first gas not until after the humidity transfer between the first gas and the second gas in the humidifier.

The system can comprise an expander which is configured to convert at least a part of the thermal energy of the second gas and/or of the kinetic energy of the second gas into kinetic energy of the expander. The second gas can therefore be fed to an expander after the humidity transfer between the first gas and the second gas. The thermal energy of the second gas and/or the kinetic energy of the second gas can then be converted at least partly into kinetic energy of the expander. The expander can e.g. comprise a turbine or piston. The expander can be in fluid connection with the humidifier in a manner such that coming from the humidifier the second gas can be fed to the expander. The expander can therefore in particular be in fluid connection with the volume of the humidifier which is configured for leading the second gas, thus with the previously described fourth volume.

Alternatively or additionally to the expander, the system can comprise a thermoelectric generator which is configured to convert at least a part of the thermal energy of the second gas into electrical energy. Such thermoelectric generators which are based on the thermoelectric effect (Seebeck effect) are generally known from the state of the art. The thermoelectric generator is preferably in fluid connection with the humidifier in a manner such that coming from the humidifier, the second gas can be fed to the thermoelectric generator.

The expander and the compressor and/or the expander and the further compressor can be coupled or are coupled to one another in a manner such that the energy which is transmitted from the second gas onto the expander can be transferred at least partly from the expander onto the compressor and/or onto the further compressor, for compressing the first gas which is led into the compressor or further compressor. The energy which is transferred from the second gas onto the expander can therefore be transferred from the expander onto the compressor and/or onto the further compressor, for compressing the first gas. E.g. the compressor can comprise a compressor wheel which is drivable by a turbine or a piston of the expander. A generator can likewise be provided, said generator converting the energy of the second gas which is absorbed by the expander, at least partly into electric energy. This can then serve e.g. for driving an electric motor of the compressor or other consumers in the electrochemical system.

Inasmuch as the system comprises a thermoelectric generator, the thermoelectric generator and the compressor and/or the thermoelectric generator and the further compressor can be electrically connected such that the energy which is transferred from the second gas onto the thermoelectric generator can be transferred at least partly from the thermoelectric generator onto the compressor and/or onto the further compressor, for compressing the first gas. For this, the electrical energy can possibly be intermediately stored in a store for electric energy before it is transferred to the compressor or to the further compressor.

The system can further comprise one or more bypass conduits for the improved setting of the humidity and/or the temperature of the first and/or second gas.

The system can comprise a first bypass conduit for leading the first gas, via which first bypass conduit the first gas can be led at least partly into an outlet of the humidifier whilst bypassing the gas-gas heat exchanger and the humidifier, before leading the first gas into the gas-gas heat exchanger. The first gas can be diverted at least partly into an outlet of the humidifier, e.g. into an outlet of the fourth volume in a direct manner via this bypass conduit before leading the first gas into the gas-gas heat exchanger.

The system can comprise a second bypass conduit for leading the first gas, via which second bypass conduit the first gas can be led at least partly into the fuel cell arrangement whilst bypassing the gas-gas heat exchanger and the humidifier, before leading the first gas into the gas-gas heat exchanger. The first gas can be diverted at least partly into the fuel cell arrangement in a direct manner via this bypass conduit before leading the first gas into the gas-gas heat exchanger.

The system can comprise a third bypass conduit for leading the first gas, via which third bypass conduit the first gas can be led at least partly into an outlet of the gas-gas heat exchanger whilst bypassing the gas-gas heat exchanger, before leading the gas into the gas-gas heat exchanger. The first gas can be diverted at least partly into an outlet of the gas-gas heat exchanger, i.e. into an outlet of the first volume in a direct manner via this bypass conduit before leading the first gas into the gas-gas heat exchanger.

The system can comprise a fourth bypass conduit for leading the first gas, via which fourth bypass conduit the gas can be led at least partly into the fuel cell arrangement whilst bypassing the humidifier, after letting the first gas out of the gas-gas heat exchanger and before leading the first gas into the humidifier. The first gas can be diverted at least partly into the fuel cell arrangement in a direct manner via this bypass conduit after letting the first gas out of the gas-gas heat exchanger and before leading the first gas into the humidifier.

The system can comprise a fifth bypass conduit for leading the first gas, via which fifth bypass conduit the first gas can be led at least partly into a conduit which exits from the fuel cell arrangement, whilst bypassing the fuel cell arrangement, after letting the first gas out of the humidifier and before leading the first gas into the gas-gas heat exchanger. The first gas can be diverted at least partly into the gas-gas heat exchanger via this bypass conduit before leading the first gas into the fuel cell arrangement.

The system can comprise a first bypass conduit for leading the second gas, via which first bypass conduit the second gas can be led at least partly into an outlet of the humidifier whilst bypassing the gas-gas heat exchanger and the humidifier, after letting the second gas out of the fuel cell arrangement and before leading the second gas into the gas-gas heat exchanger. The second gas can be diverted at least partly into an outlet of the humidifier, e.g. into an outlet of the fourth volume in a direct manner via this bypass conduit before leading the second gas into the gas-gas heat exchanger.

The system can comprise a second bypass conduit for leading the second gas, via which second bypass conduit the second gas can be led at least partly into an outlet of the gas-gas heat exchanger whilst bypassing the gas-gas heat exchanger, after letting the second gas out of the fuel cell arrangement and before leading the second gas into the gas-gas heat exchanger. The second gas can be diverted at least partly into an outlet of the gas-gas heat exchanger, e.g. into an outlet of the second volume in a direct manner via this bypass conduit, before leading the second gas into the gas-gas heat exchanger.

The system can comprise a third bypass conduit for leading the second gas, via which third bypass conduit the second gas can be led at least partly into an outlet of the humidifier whilst bypassing the humidifier, after letting the second gas out of the gas-gas heat exchanger and before leading the second gas into the humidifier. The second gas can be diverted at least partly into an outlet of the humidifier, e.g. into an outlet of the fourth volume in a direct manner via this bypass conduit, after letting the second gas out of the gas-gas heat exchanger and before leading the second gas into the humidifier.

BRIEF DESCRIPTION OF THE DRAWINGS

Embodiment examples of the invention are represented in the figures and are explained in more detail by way of the subsequent description. There are shown in.

DETAILED DESCRIPTION OF THE INVENTION

Figure 1A:
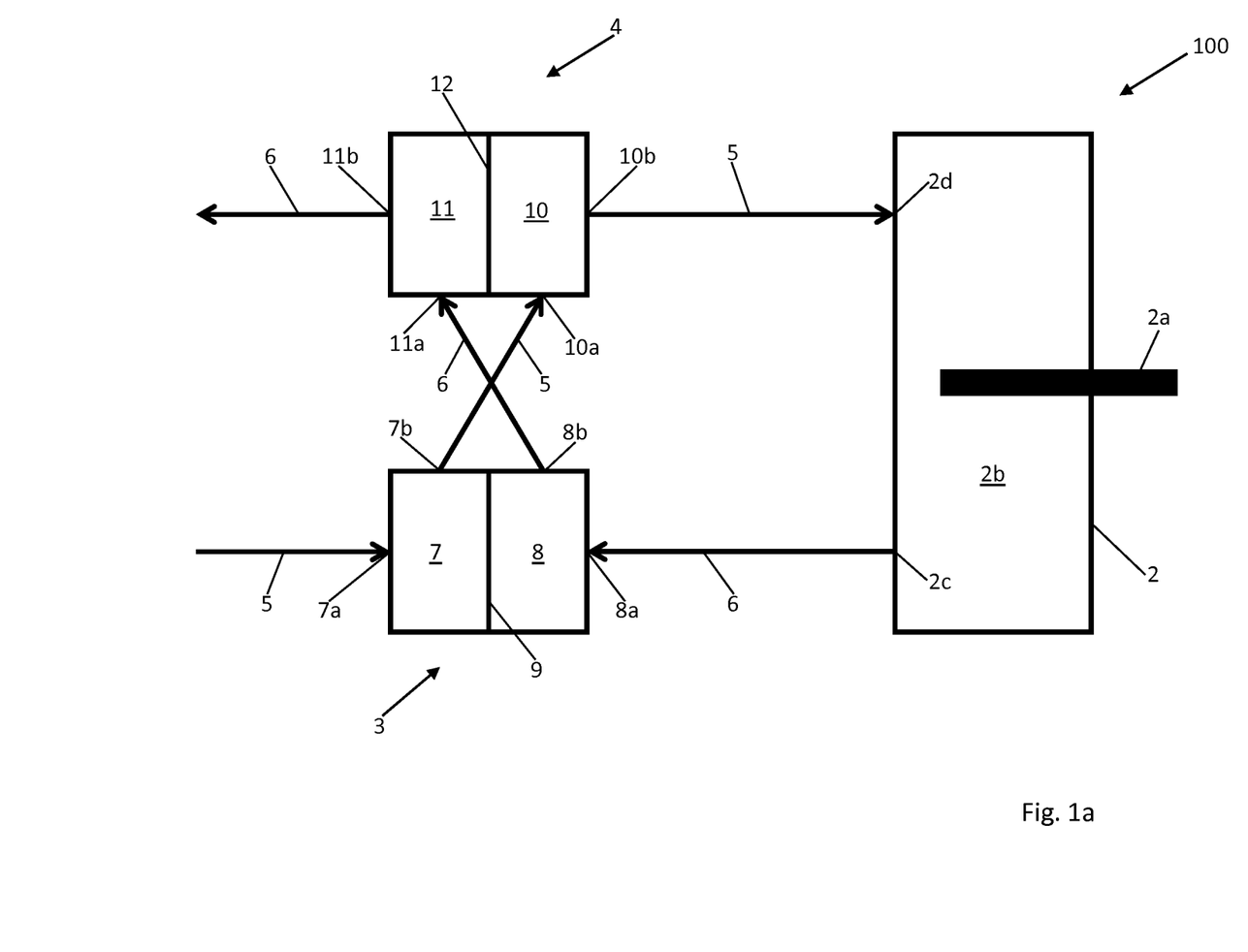
FIG. 1a schematically, a gas feed and discharge system according to the invention, with a fuel cell arrangement, a gas-gas heat exchanger and a humidifier.

FIG. 1a shows a gas feed and discharge system 100 with a fuel cell arrangement 2, with a gas-gas heat exchanger 3 and with a humidifier 4. The fuel cell arrangement 2 comprises at least one electrode 2a and a reaction volume 2b.

The electrode 2a is arranged at least partly within the reaction volume 2b or reaches up to the reaction volume 2b. A first gas 5 is fed to the electrode 2a via the reaction volume 2b. The arrows which represent the first gas 5 stand for conduits, in which the first gas 5 is led, wherein the arrow direction specifies the flow direction of the first gas 5 in the respective conduit. A second gas 6 is led away from the electrode 2a likewise via the reaction volume 2b. The arrows which represent the second gas 6 again stand for conduits, in which the second gas 6 is led, wherein the arrow direction specifies the flow direction of the second gas 6 in the respective conduit.

Here, the electrode 2a is a cathode of the fuel cell arrangement 2. The fuel cell arrangement 2 yet comprises a multitude of further cathodes and anodes which are not represented here and hereinafter for the sake of simplicity. E.g. the first gas 5 can be simultaneously fed to a multitude of cathodes via the reaction volume 2b. The second gas 6 can likewise be simultaneously led away from a multitude of cathodes via the reaction volume 2b.

In the represented embodiment example, the fuel cell arrangement 2 is a hydrogen fuel cell arrangement. The first gas 5 comprises air and/or oxygen. The oxygen which is contained in the first gas 5 absorb electrons at the cathode 2a and in the reaction volume 2b reacts with protons which diffuse from an adjacent anode through a membrane into the reaction volume 2b, into water. The second gas 6 comprises water vapour which arises with this reaction.

The gas-gas heat exchanger 3 comprises a first volume 7 for leading the first gas 5 and a second volume 8 for leading the second gas 6. An inlet 7a of the first volume 7 is connected e.g. to a gas reservoir (not shown) via a conduit for leading the first gas 5, so that coming from the gas reservoir, the first gas 5 can be led or is led into the first volume 7. An inlet 8a of the second volume 8 is connected to an outlet 2c of the fuel cell arrangement 2, in particular to an outlet 2c of the reaction volume 2b via a conduit for leading the second gas 6, so that coming from the fuel cell arrangement 2 or coming from the reaction volume 2b, the second gas 6 can be led or is led directly into the second volume 8 of the gas-gas heat exchanger 3.

The first volume 7 and the second volume 8 of the gas-gas heat exchanger 3 are physically separated from one another, so that no through-mixing of the first gas 5 and the second gas 6 is effected in the gas-gas heat exchanger 3. Heat is transferred between the first gas 5 which is led in the first volume 7 and the second gas 6 which is led in the second volume 8, via a thermal contact 9 of the gas-gas heat exchanger 3. Thus an at least partial balancing of the temperatures of the gases 5 and 6 is effected in the gas-gas heat exchanger 3. Here, on leading the first gas 5 into the first volume 7, the temperature of the first gas 5 is higher than the temperature of the second gas 6 on leading the second gas 6 into the second volume 8, so that heat is transferred from the first gas 5 onto the second gas 6 in the gas-gas heat exchanger 3. E.g. the first gas 5 has a temperature between 200° C. and 250° C. on leading the first gas 5 into the first volume 7, and the second gas 6 has a temperature e.g. between 60° C. and 80° C. on leading the second gas 6 into the volume 8. The thermal contact 9 between the first volume 7 and the second volume 8 is realised merely by way of solid bodies, e.g. in the form of plates and/or lamellae. A possibly existing further cooling system for cooling the fuel cell arrangement 2 can be designed smaller due to the at least partial cooling of the first gas 5 which is to be fed to the electrode 2a, with the help of the second gas which is led away from the electrode 2a, in the gas-gas heat exchanger 3.

The humidifier 4 comprises a third volume 10 for leading the first gas 5 and a fourth volume 11 for leading the second gas 6. An outlet 7b of the first volume 7 of the gas-gas heat exchanger 3 is connected to an inlet 10a of the third volume 10 of the humidifier 4 via a conduit. Coming from the first volume 7 of the gas-gas heat exchanger 3, the first gas 5 is led directly into the third volume 10 of the humidifier 4 via this conduit, after the heat transfer between the first gas 5 and the second gas 6 in the gas-gas heat exchanger 3. An outlet 8b of the second volume 8 of the gas-gas heat exchanger 3 is connected via a conduit to an inlet 11a of the fourth volume 11 of the humidifier 4. Coming from the second volume 8 of the gas-gas heat exchanger 3, the second gas 6 is led directly into the fourth volume 11 of the humidifier 4 via this conduit, after the heat transfer between the first gas 5 and the second gas 6 in the gas-gas heat exchanger 3. Here and hereinafter, conduits which are represented in the figures as conduits crossing one another are not to be in fluid connection with one another at the crossing point.

The humidifier 4 further comprises a water exchange membrane 12 which is arranged between the third volume 10 and the fourth volume 12 and which separates the third volume 10 from the fourth volume 12. Alternatively or additionally, the humidifier 4 can be designed as a tube humidifier or comprise capillaries for transferring humidity between the third volume 10 and the fourth volume 12. A humidity transfer between the gases which are led in the volumes 10 and 11 of the humidifier 4 can be effected via the water exchange membrane 12. In the present embodiment example, the humidity degree of the second gas 6 which is led away from the electrode 2a, on leading the second gas 6 into the fourth volume 11 of the humidifier 4 is higher than the humidity degree of the first gas 5 which is to be fed to the electrode 2a, on leading the first gas 5 into the third volume 10 of the humidifier 4. For this reason, humidity is transferred here in the humidifier 4 from the second gas 6 in the fourth volume 11 onto the first gas 5 in the third volume 10. The water exchange membrane 12 is not permeable to gases, so that no through-mixing of the first gas 5 with the second gas 6 takes place in the humidifier 4.

It has been found that the humidity transfer between the gases 5 and 6 in the humidifier 4 is particularly efficient on account of the at least partial balancing of the temperatures of the gases 5 and 6 in the gas-gas heat exchanger 3 before leading the gases 5 and 6 into the humidifier 4. The water exchange membrane 12 can therefore be designed smaller for transferring the same quantity of water via this. Furthermore, the service life of the water exchange membrane 12 of the humidifier 4 can be extended by the prior cooling of the warmer of the two gases 5 and 6 on account of the heating, usually of the gas 5, in the gas-gas heat exchanger 3, said heating resulting from the compressing. Furthermore, an undesired condensation of the humidity which is contained in the colder of the gases 5 and 6, in the humidifier, can be prevented or reduced by way of the heating of the colder of the gases 5 and 6, i.e. at least the gas 6 in the gas-gas heat exchanger 3 before leading the gases 5 and 6 into the humidifier 4. This also contributes to a more efficient humidity transfer via the water exchange membrane 12 of the humidifier 4.

The second gas 6 is led away out of the humidifier 4 via an outlet 11b of the volume 11 of the humidifier 4. An outlet 10b of the volume 10 of the humidifier 4 is connected via a conduit to an inlet 2d of the fuel cell arrangement 2, in particular to an inlet 2d of the reaction volume 2b. Coming from the humidifier 4, the first gas 5 is led via this conduit into the fuel cell arrangement 2 and via the reaction volume 2b is fed to the electrode 2a, after the humidity transfer between the first gas 5 and the second gas 6 in the humidifier 4. The humidification of the first gas 5 which is to be introduced into the fuel cell arrangement 2, in the humidifier 4, amongst other things serves for avoiding a drying-out of the proton exchange membrane of the fuel cell arrangement 2 which is not shown here and via which the proton exchange between the non-represented anode and the cathode 2a of the fuel cell arrangement 2 is effected.

Figure 1B:
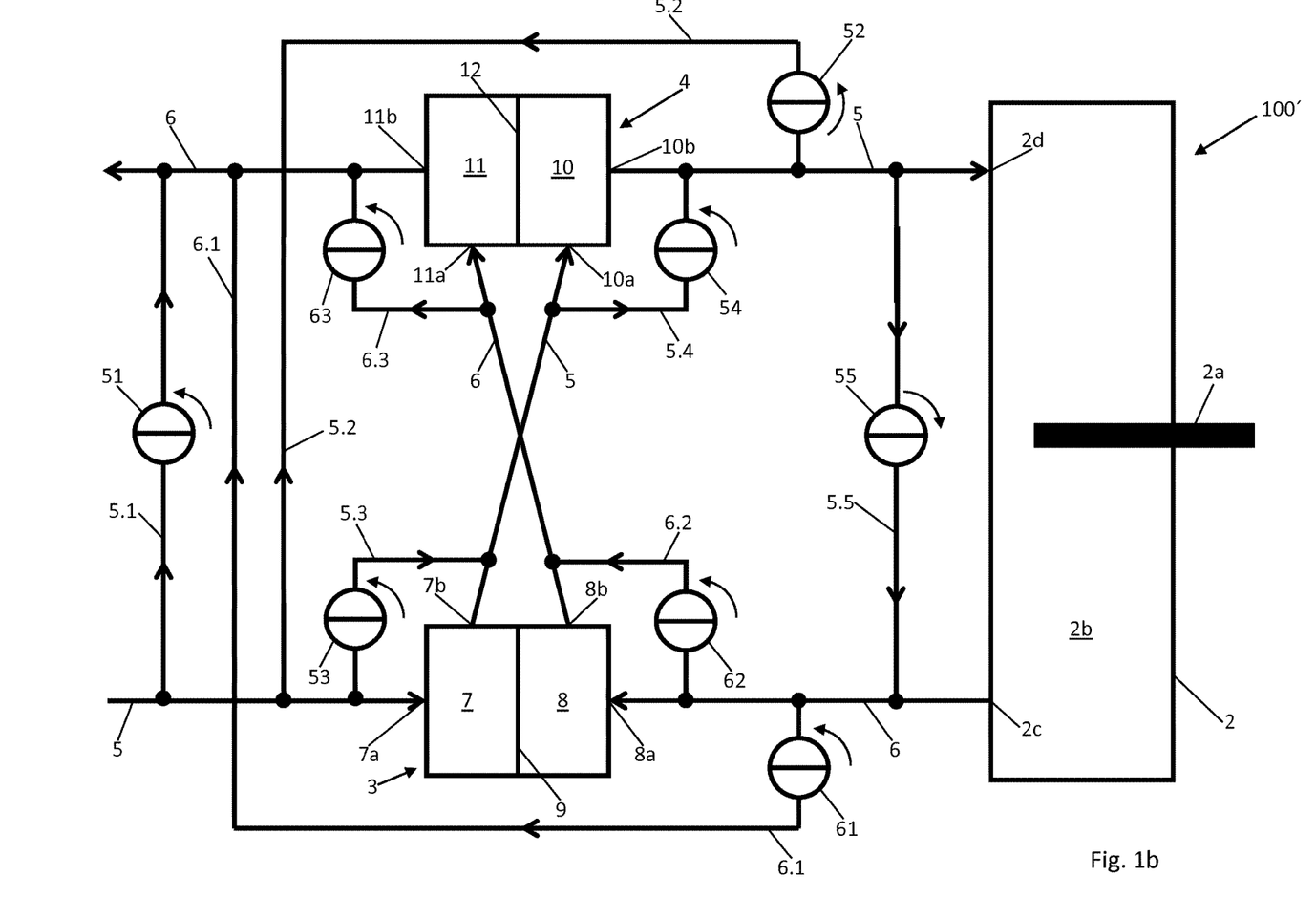
FIG. 1b schematically, the gas feed and discharge system according to FIG. 1a, with additional bypass conduits.

FIG. 1b shows a further gas feed and discharge system 100' which is a variant of the gas feed and discharge system 100 according to FIG. 1. Here and hereinafter, recurring features are herein provided with the same reference numerals. It is therefore only differences between the systems 100 and 100' which are explained in more detail, for the sake of simplicity.

The system 100' according to FIG. 1b differs from the system 100 according to FIG. 1a by a first bypass conduit 5.1 for leading the first gas 5, via which first bypass conduit the first gas 5, before leading the first gas 5 into the gas-gas heat exchanger 3 and whilst bypassing the gas-gas heat exchanger 3, the fuel cell arrangement 2 and the humidifier 4, can be led at least partly into an outlet of the humidifier 4 which is in fluid connection with the fourth volume 11 of the humidifier 4. The flow of the first gas 5 in the conduit 5.1 is controllable by a valve 51. The valve 51 can be completely closed for preventing the gas flow in the conduit 5.1.

The system 100' according to FIG. 1b further differs from the system 100 according to FIG. 1a by a second bypass conduit 5.2 for leading the first gas 5, via which second bypass conduit the first gas 5, before leading the first gas 5 into the gas-gas heat exchanger 3 and whilst bypassing the gas-gas heat exchanger 3 and the humidifier 4, can be led at least partly into the fuel cell arrangement 2, in particular via the inlet 2*d* of the fuel cell arrangement 2. The flow of the first gas 5 in the conduit 5.2 is controllable by a valve 52. The valve 52 can be completely closed for preventing a gas flow in the conduit 5.2.

The system 100' according to FIG. 1*b* further differs from the system 100 according to FIG. 1*a* by a third bypass conduit 5.1 for leading the first gas 5, via which third bypass conduit the first gas 5, before leading the first gas 5 into the gas-gas heat exchanger 3 and whilst bypassing the gas-gas heat exchanger 3, can be led at least partly into an outlet of the gas-gas heat exchanger 3, in particular into an outlet of the first volume 7. The flow of the first gas 5 in the conduit 5.3 is controllable by a valve 53. The valve 53 can be completely closed for preventing the gas flow in the conduit 5.3

The system 100' according to FIG. 1*b* further differs from the system 100 according to FIG. 1*a* by a fourth bypass conduit 5.4 for leading the first gas 5, via which fourth bypass conduit the first gas, after letting the first gas 5 out of the gas-gas heat exchanger 3 and before leading the first gas 5 into the humidifier 4 and whilst bypassing the humidifier 4, can be led at least partly into the fuel cell arrangement 2, in particular via the inlet 2 of the fuel cell arrangement 2. The flow of the first gas 5 in the conduit 5.4 is controllable by a valve 54. The valve 54 can be completely closed for preventing the gas flow in the conduit 5.4.

The system 100' according to FIG. 1*b* further differs from the system 100 according to FIG. 1*a* by a fifth bypass conduit 5.5 for leading the first gas 5, via which fifth bypass conduit the first gas 5, after letting the first gas out of the humidifier 4 and before leading the first gas into the gas-gas heat exchanger 3*a* and whilst bypassing the fuel cell arrangement 2, can be led at least partly into a conduit which exits from the fuel cell arrangement 2. The flow of the first gas 5 in the conduit 5.5 is controllable by a valve 55. The valve 55 can be completely closed for preventing the gas flow in the conduit 5.5.

The system 100' according to FIG. 1*b* further differs from the system 100 according to FIG. 1*a* by a first bypass conduit 6.1 for leading the second gas 6, via which first bypass conduit the second gas 6, after letting the second gas 6 out of the fuel cell arrangement 2 and before leading the second gas 6 into the gas-gas heat exchanger 3 and whilst bypassing the gas-gas heat exchanger 3 and the humidifier 4, can be led at least partly into an outlet of the humidifier 4, in particular into an outlet of the fourth volume 11. The flow of the second gas 6 in the conduit 6.1 is controllable by a valve 61. The valve 61 can be completely closed for preventing the gas flow in the conduit 6.1.

The system 100' according to FIG. 1*b* differs further from the system 100 according to FIG. 1*a* by a second bypass conduit 6.2 for leading the second gas 6, via which second bypass conduit the second gas 6, after letting the second has 6 out of the fuel cell arrangement 2 and before leading the second gas 6 into the gas-gas heat exchanger 3 and whilst avoiding the gas-gas heat exchanger 3, can be led at least partly into an outlet of the gas-gas heat exchanger 3, in particular into an outlet of the second volume 8. The flow of the second gas 6 in the conduit 6.2 is controllable by a valve 62. The valve 62 can be completely closed for preventing the flow of gas in the conduit 6.2

The system 100' according to FIG. 1*b* further differs from the system 100 according to FIG. 1*a* by a third bypass conduit 6.3 for leading the second gas 6, via which third bypass conduit the second gas 6, after letting the second gas 6 out of the gas-gas heat exchanger 3 and before leading the second gas 6 into the humidifier 4 and whilst bypassing the humidifier 4, can be led at least partly into an outlet of the humidifier 4, in particular into an outlet of the fourth volume 11. The flow of the second gas 6 in the conduit 6.3 is controllable by a valve 63. The valve 63 can be completely closed for preventing the flow of gas in the conduit 6.3.

The system 100' according to FIG. 1*b* can comprise one, several or all of the bypass conduits 5.1, 5.2, 5.3, 5.4, 5.5, 6.1, 6.2 and 6.3. In FIG. 1*b*, conduits which cross one another and which are in fluid connection with one another at the respective crossing point are explicitly marked by a black dot at the crossing point. Conduits which cross one another and which are not marked by a black dot at the crossing point are not in fluid connection with one another at the crossing point.

Figure 2:
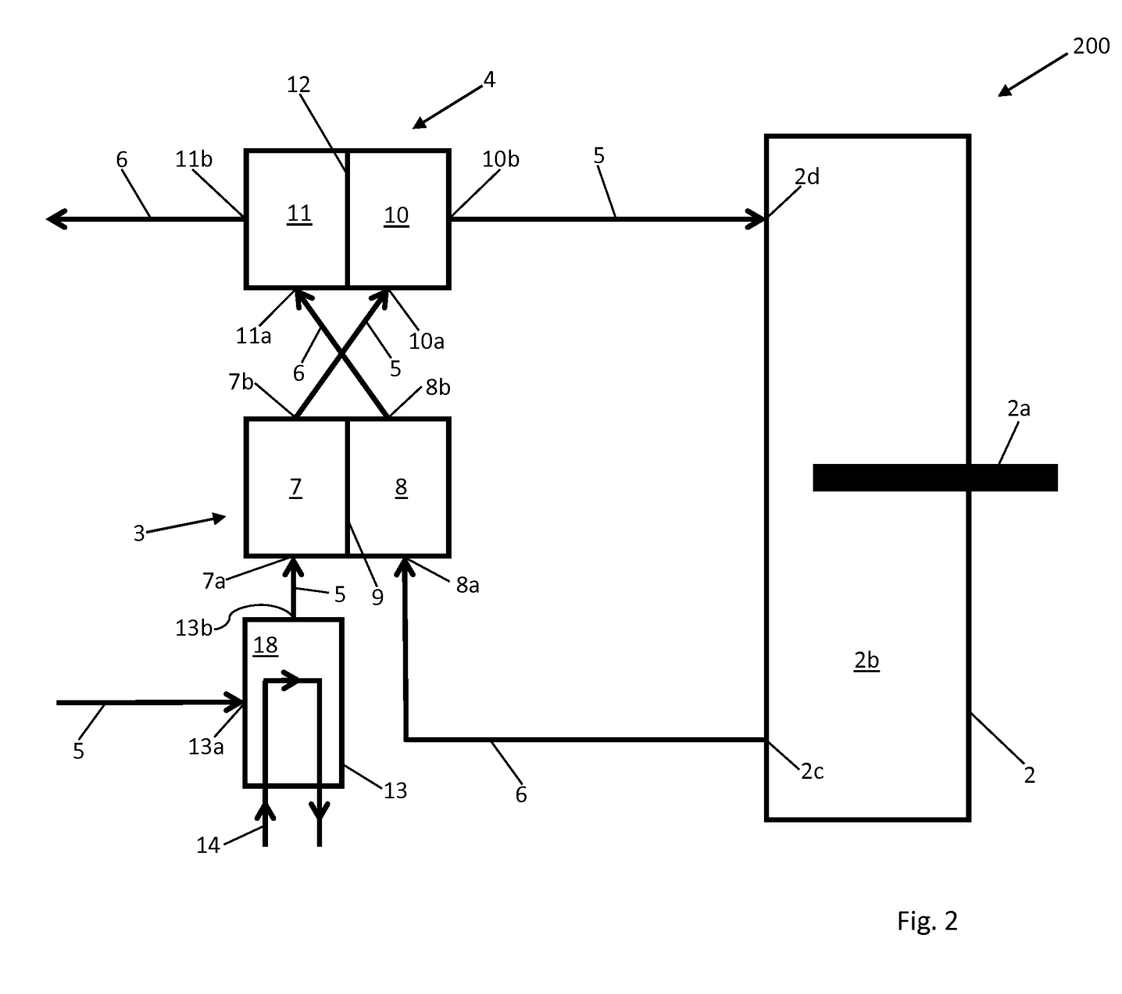
FIG. 2 schematically, a further embodiment of the gas feed and discharge system according to FIG. 1a, with an additional gas-liquid heat exchanger.

FIG. 2 shows a further gas feed and discharge system 200. The system 200 according to FIG. 2 differs from the system 100 according to FIG. 1 by the fact that the system 200 comprises a gas-liquid heat exchanger 12 which is arranged upstream of the gas-gas heat exchanger 3. The gas-liquid heat exchanger 13 of the system 200 serves for transferring heat between the first gas 5 and a liquid coolant 14 before leading the first gas 5 into the gas-gas heat exchanger 3. The temperature adjustment of the first gas 5 can be further improved with the help of the gas-liquid heat exchanger 13. Here, the gas-liquid heat exchanger 13 of the system 200 serves for cooling of the first gas 5 before leading the first gas 5 into the gas-gas heat exchanger 3.

The gas-liquid heat exchanger 13 comprises a volume 18 for leading the first gas. The first gas 5 e.g. coming from the previously described gas reservoir is led into the volume 18 via an inlet 13*a*. An outlet 13*b* of the volume 18 is connected via a conduit to an inlet 7*a* of the first volume 7 of the gas-gas heat exchanger 3. A coolant 14 can be circulated in the volume 18 or through the volume 18, so that a heat transfer between the first gas 5 which is led in the volume 18 and the cooling medium 14 is effected in the volume 18.

With modified embodiments, the gas-liquid heat exchanger 13 can additionally also be designed for transferring heat between the second gas 6 and the coolant 14. For this, the gas-liquid heat exchanger 13 can comprise e.g. a further volume for leading the second gas 6, in which or through which volume the coolant 14 can be circulated. The second gas e.g. coming from the fuel cell arrangement 2 can be led into this further volume of the gas-liquid heat exchanger 13 and coming from this further volume of the gas-liquid heat exchanger 13 can be led into the second volume 8 of the gas-gas heat exchanger 3, as described in reference to the system 100.

The design of the fuel cell arrangement 2, of the gas-gas heat exchanger 3 and of the humidifier 4 of the system 200 and their fluidic connection amongst one another correspond to those of the system 100 according to FIG. 1*a*. In particular, the system 200 can optionally comprise one, several or all of the bypass conduits 5.1, 5.2, 5.3, 5.4, 5.5, 6.1, 6.2 and 6.3 which are represented in FIG. 1*b*. Likewise, the method for leading the first gas 5 onto the electrode 2*a* and for leading the second gas 6 away from the electrode 2*a* can be carried out with the system 200 as described with reference to the system 100 according to FIG. 1*a*.

Figure 3:
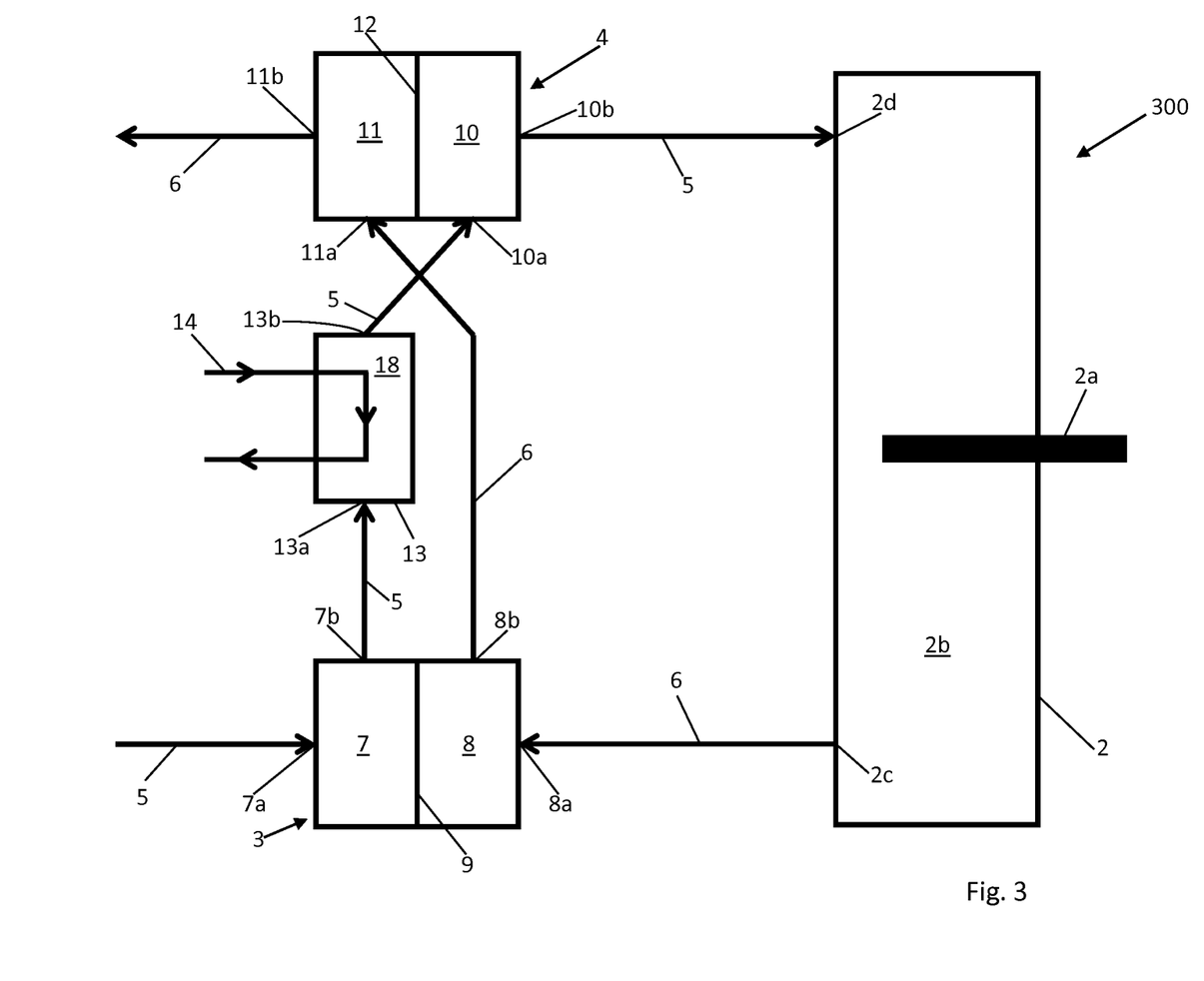
FIG. 3 schematically, a further embodiment of the gas feed and discharge system according to FIG. 1a, with an additional gas-liquid heat exchanger.

FIG. 3 shows a further gas feed and discharge system 300. The gas feed and discharge system 300 according to FIG. 3 differs from the system 200 according to FIG. 2 in that the gas-liquid heat exchanger 13 is arranged between the gas-gas heat exchanger 3 and the humidifier 4. The outlet 7b of the first volume 7 is connected via a conduit to the inlet 13a of the gas-liquid heat exchanger 13. The first gas is led out of the first volume 7 of the gas-gas heat exchanger 3 into the volume 18 of the gas-liquid heat exchanger 13 via this conduit after the heat exchange between the first gas 5 and the second gas 6 in the gas-gas heat exchanger 3. The outlet 13b of the gas-liquid heat exchanger 13 is connected via a conduit to the inlet 10a of the third volume 10 of the humidifier 4. The first gas 5 is led out of the volume 18 of the gas-liquid heat exchanger 13 into the third volume 18 of the humidifier 4 via this conduit after the heat exchange between the first gas 5 and the coolant 14 in the gas-liquid heat exchanger 13.

The design of the fuel cell arrangement 2, of the gas-gas heat exchanger 3 and of the humidifier 4 of the system 300 and their fluid connections amongst one another otherwise correspond to those of the system 100 according to FIG. 1a. In particular, the system 300 can optically additionally comprise one, more or all of the bypass conduits 5.1, 5.2, 5.3, 5.4, 5.5, 6.1, 6.2 and 6.3 which are represented in FIG. 1b. Herein, the bypass conduit 5.3 can create a fluid connection between the inlet 7a of the first volume 7 and the outlet 13b of the gas-liquid heat exchanger 13. The first gas 5 can therefore be led at least partly into the humidifier 4, in particular into the third volume 10 of the humidifier 4 in a direct manner via the bypass conduit 5.3 before leading the first gas 5 into the gas-gas heat exchanger 3 and whilst bypassing the gas-gas heat exchanger 3 and the gas-liquid heat exchanger 13. The method for leading the first gas 5 onto the electrode 2a and for leading away the second gas 6 from the electrode 2a can be carried out with the system 300 as described with regard to the system 100 according to FIG. 1a.

Figure 4:
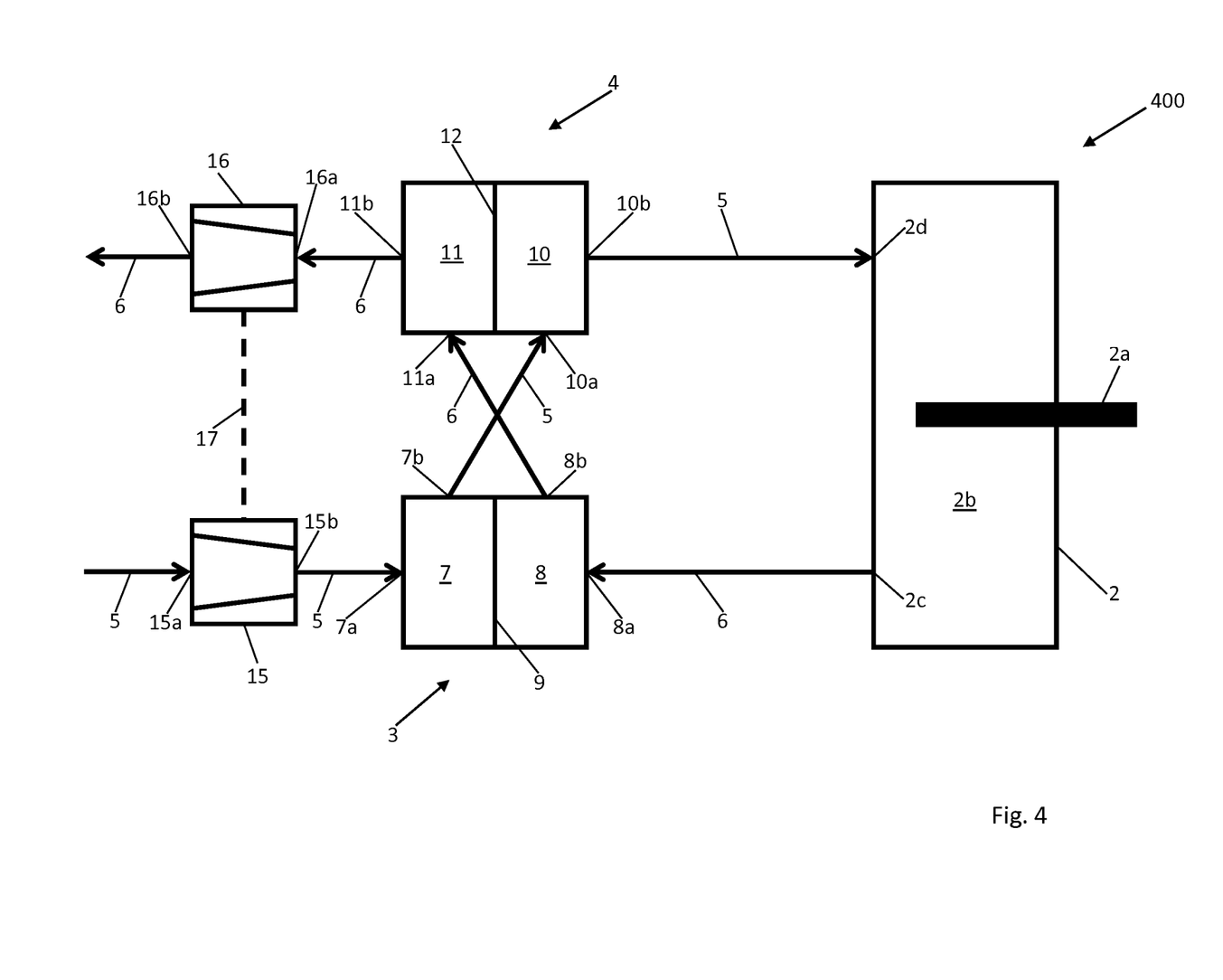
FIG. 4 schematically, a further embodiment of the gas feed and discharge system according to FIG. 1a, with a compressor and an expander.

FIG. 4 shows a further gas feed and discharge system 400. The gas feed and discharge system 400 according to FIG. 4 differs from the system 100 according to FIG. 1a by a compressor 15 which compresses the first gas 5 before leading the first gas 5 into the gas-gas heat exchanger 3, and by an expander 16 which converts at least a part of the thermal energy of the second gas and/or of the kinetic energy of the second gas into kinetic energy of the expander 16. A reaction rate of the reaction between the first gas 5 and the electrode 2a can be increased by way of the compressing of the first gas 5 before leading the first gas 5 into the fuel cell arrangement 2 and leading the first gas 5 onto the electrode 2a. This can increase the efficiency of the fuel cell arrangement 3 on converting chemical energy into electrical energy.

An inlet 15a of the compressor can be connected e.g. to the previously described gas reservoir. An outlet 15b of the compressor is connected via a conduit to the inlet 7a of the first volume of the gas-gas heat exchanger 3. Coming from the compressor 15, the first gas 5 is led into the first volume 7 of the gas-gas heat exchanger 3. The outlet 11b of the fourth volume 11 of the humidifier 4 is connected via a conduit to an inlet 16a of the expander 16. The second gas 6 is led onto the expander 16 after the humidity transfer between the first gas 5 and the second gas 6 in the humidifier 4.

The compressor 15 can be designed as a rotation compressor with a compressor wheel. The expander can comprise a turbine which is driven by the second gas 6. The energy of the second gas 6 which is absorbed by the expander 16 can be transferred at least partly onto the compressor 15 via a coupling 17 between the expander 16 and the compressor 15 and is thus used for compressing the first gas 5 in the compressor. The coupling 17 can be a mechanical coupling, e.g. in the form of a belt connection between a turbine of the expander 16 and a compressor wheel of the compressor 15. The coupling 17 can also comprise a generator for converting kinetic energy of the expander 16 into electric energy. This electrical energy can then for example drive an electric motor which for its part drives a compressor wheel of the compressor 15.

Here and hereinafter, a thermoelectric generator can also be provided alternatively or additionally to the expander, said generator being configured to at least partly convert the thermal energy of the second gas 6 into electric energy. The thermoelectric generator can then be connected to the compressor 15 via an electric lead, so that the electric energy can be transferred from the thermoelectric generator onto the compressor 15. The compressing of the first gas 5 by the compressor 15 can then be carried out at least partly with the help of the electrical energy which is transferred from the thermoelectric generator onto the compressor 15.

The design of the fuel cell arrangement 2, of the gas-gas heat exchanger 3 and of the humidifier 4 of the system 400 and their fluid connections amongst one another otherwise correspond to those of the system 100 according to FIG. 1a. In particular, the system 400 can optionally additionally comprise one, more or all of the bypass conduits 5.1, 5.2, 5.3, 5.4, 5.5, 6.1, 6.2 and 6.3 which are represented in FIG. 1b. The method for leading the first gas 5 onto the electrode 2a and for leading the second gas 6 away from the electrode 2a can be carried out with the system 400 as is described with reference to the system 100 according to FIG. 1a.

Figure 5:
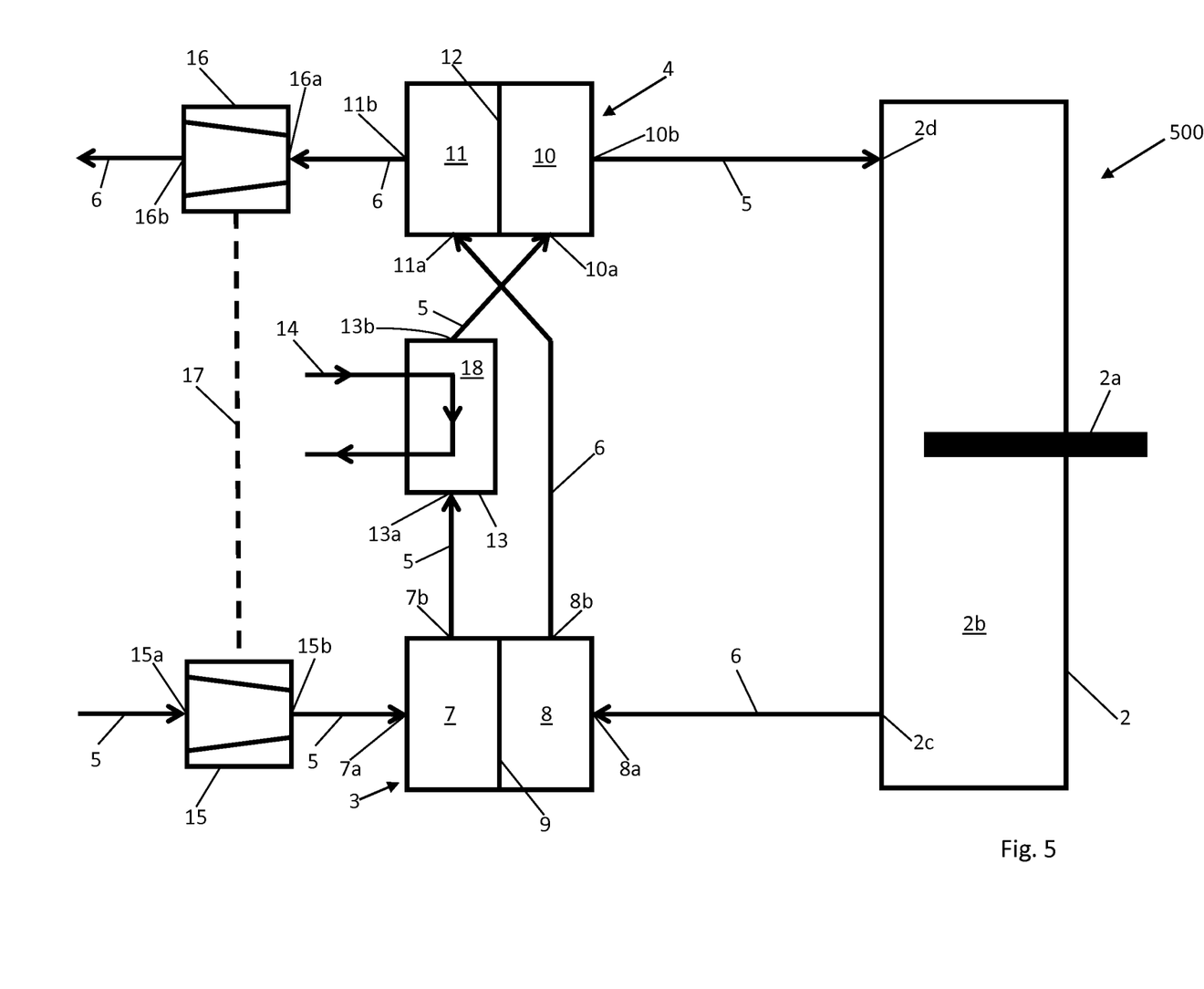
FIG. 5 schematically, an embodiment of the gas feed and discharge system according to FIG. 1a, with an additional gas-liquid heat exchanger as well as with a compressor and expander, according to a first arrangement; as well as FIG. 6 schematically, an embodiment of the gas feed and discharge system according to FIG. 1a, with an additional gas-liquid heat exchanger as well as with a compressor and an expander, according to a third arrangement.

FIG. 5 shows a further gas feed and discharge system 500. The design of the compressor 15, of the expander 16 and of the coupling 17 as well as the fluid connections of the compressor 15 and of the expander 16 to the gas-gas heat exchanger 3 and to the humidifier 4 are realised as with the system 400 according to FIG. 4. The design of the gas-liquid heat exchanger 13 as well as the fluidic connection of the gas-liquid heat exchanger 13 to the gas-gas heat exchanger 3 and to the humidifier 4 are realised as with the system 300 according to FIG. 3.

The design of the fuel cell arrangement 2, of the gas-gas heat exchanger 3 and of the humidifier 4 of the system 500 and their fluid connections amongst one another otherwise correspond to those of the system 100 according to FIG. 1a. In particular, the system 500 can optionally additionally comprise one, more or all of the bypass conduits 5.1, 5.2, 5.3, 5.4, 5.5, 6.1, 6.2 and 6.3 which are represented in FIG. 1b. Herein, the bypass conduit 5.3 can create a fluid connection between the inlet 7a of the first volume 7 and the outlet 13b of the gas-liquid heat exchanger 13. The first gas 5 can therefore be led at least partly into the humidifier 4, in particular into the third volume 10 of the humidifier 4 in a direct manner via the bypass conduit 5.3 before leading the first gas 5 into the gas-gas heat exchanger 3 and whilst bypassing the gas-gas heat exchanger 3 and the gas-liquid heat exchanger 13. The method for leading the first gas 5 onto the electrode 2a and for leading the second gas 6 away from the electrode 2a can likewise be carried out by the system 500 as is described with respect to the system 100 according to FIG. 1a.

Figure 6:
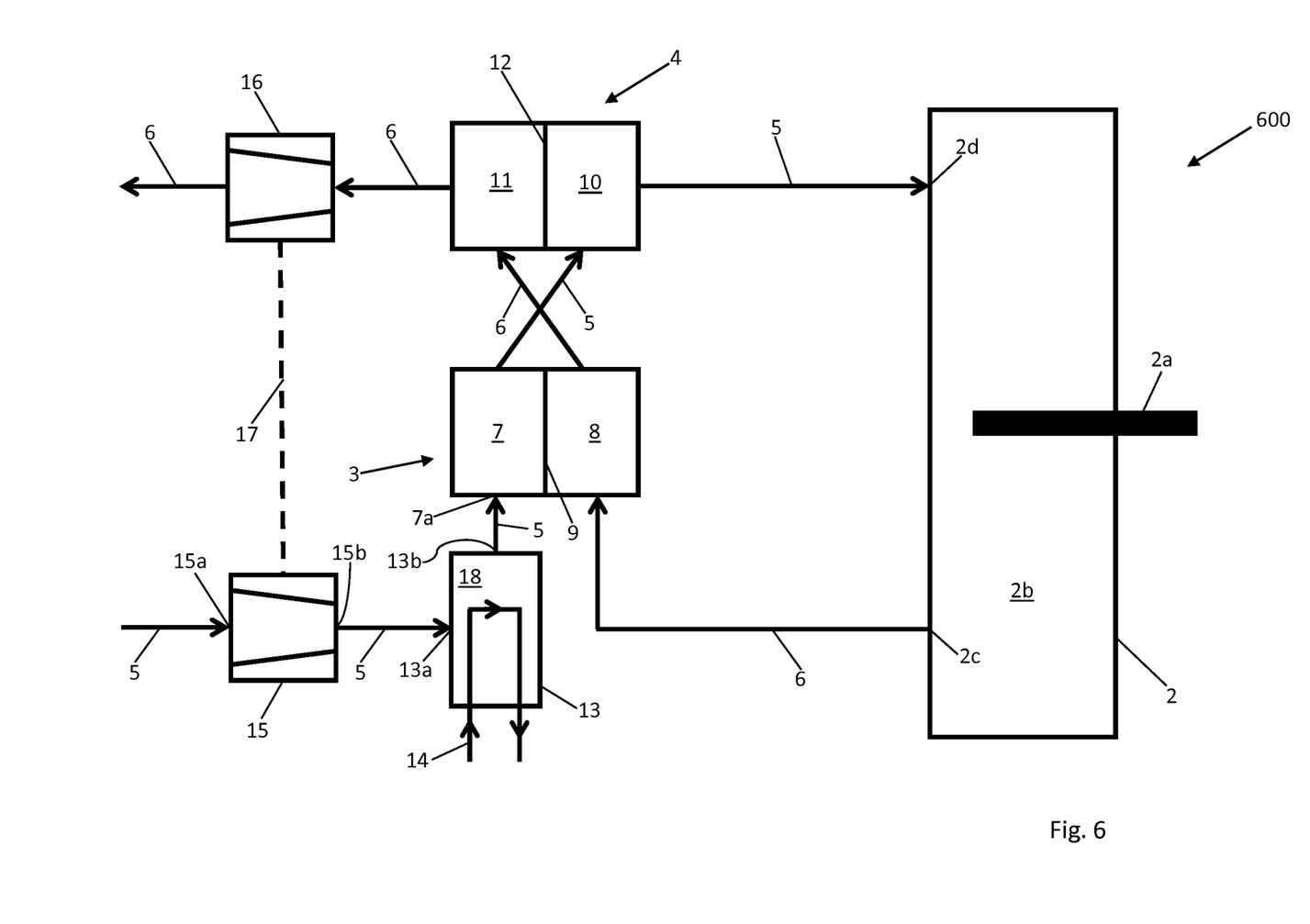

FIG. 6 shows a further gas feed and discharge system 600. The design of the compressor 15, of the expander 16 and of the coupling 17 as well as the fluidic connection of the expander 16 to the humidifier 4 are realised as with the system 400 according to FIG. 4. The design of the gas-liquid heat exchanger 13 as well as the fluid connection of the gas-liquid heat exchanger 13 to the gas-gas heat exchanger 3 are realised as with the system 200 according to FIG. 2.

The outlet 15b of the compressor 15 is connected to the inlet 13a of the gas-liquid heat exchanger 13 via a conduit, so that the first gas 5 which is compressed in the compressor 15, coming from the compressor 15, is led into the gas-liquid heat exchanger 13 and from this into the first volume 7 of the gas-gas heat exchanger 3.

The design of the fuel cell arrangement 2, of the gas-gas heat exchanger 3 and of the humidifier 4 of the system 600 and their fluidic connections amongst one another otherwise correspond to those of the system 100 according to FIG. 1a. In particular, the system 600 can optionally additionally comprise one, more or all of the bypass conduits 5.1, 5.2, 5.3, 5.4, 5.5, 6.1, 6.2 and 6.3 which are represented in FIG. 1b. The method for leading the first gas 5 onto the electrode 2a and for leading the second gas 6 away from the electrode 2a can likewise be carried out with the system 600 as is described with reference to the system 100 according to FIG. 1a.

The invention claimed is:

1. A method for leading a first gas onto at least one electrode of a fuel cell arrangement and for leading a second gas away from the at least one electrode, comprising the steps;
    leading the first gas which is to be fed to the electrode into a gas-gas heat exchanger and leading the second gas which is led away from the electrode into the gas-gas heat exchanger, for transferring heat between the first gas and the second gas in the gas-gas heat exchanger, wherein an outlet for the second gas in the gas-gas heat exchanger is in direct fluid connection with an inlet of a humidifier for the second gas;
    coming from the gas-gas heat exchanger, leading the first and second gas which are temperature adjusted in the gas-gas heat exchanger into a humidifier for transferring humidity between the first gas and the second gas in the humidifier; and
    coming from the humidifier, leading the first gas which is humidified or dehumidified in the humidifier onto the electrode.

2. The method according to claim 1, wherein the first gas and/or the second gas are led into a gas-liquid heat exchanger which transfers heat between the first gas and/or the second gas and a liquid coolant.

3. The method according to claim 2, wherein the first gas and/or the second gas is/are led into the gas-liquid heat exchanger before the leading into the gas-gas heat exchanger and coming from the gas-liquid heat exchanger is/are led into the gas-gas heat exchanger.

4. The method according to claim 2, wherein the first gas and/or the second gas after the heat transfer in the gas-gas heat exchanger and coming from the gas-gas heat exchanger is/are led into the gas-liquid heat exchanger and coming from the gas-liquid heat exchanger is/are led into the humidifier.

5. The method according to claim 2, wherein the first gas is compressed before leading the first gas onto the electrode or before leading the first gas into the gas-gas heat exchanger.

6. The method according to claim 5, wherein the first gas is compressed after the humidity transfer between the first gas and the second gas is effected in the humidifier.

7. The method according to claim 1, wherein the second gas after the humidity transfer between the first gas and the second gas in the humidifier and coming from the humidifier is fed to an expander or a thermoelectric generator and the thermal energy of the second gas and/or the kinetic energy of the second gas is converted at least partly into kinetic energy of the expander or into electrical energy.

8. The method according to claim 7, wherein the energy which is transferred from the second gas onto the expander or onto the thermoelectric generator is transferred at least partly from the expander or from the thermoelectric generator onto the compressor and/or onto the further compressor, for compressing the first gas.

9. The method according to claim 1, further comprising one or more of the following steps:
    at least partly diverting the first gas into an outlet of the humidifier before leading the first gas into the gas-gas heat exchanger;
    at least partly diverting the first gas into the fuel cell arrangement before leading the first gas into the gas-gas heat exchanger;
    at least partly diverting the first gas into an outlet of the gas-gas heat exchanger before leading the first gas into the gas-gas heat exchanger;
    at least partly diverting the first gas into the fuel cell arrangement after letting the first gas out of the gas-gas heat exchanger and before leading the first gas into the humidifier;
    at least partly diverting the first gas into a conduit which exits from the fuel cell arrangement, after letting the first gas out of the humidifier and before leading the first gas into the gas-gas heat exchanger;
    at least partly diverting the second gas into an outlet of the humidifier before leading the second gas into the gas-gas heat exchanger;
    at least partly diverting the second gas into an outlet of the gas-gas heat exchanger before leading the second gas into the gas-gas heat exchanger;
    at least partly diverting the second gas into an outlet of the humidifier after letting the second gas out of the gas-gas heat exchanger and before leading the second gas into the humidifier.

* * * * *